US007111642B2

(12) United States Patent
Takeda

(10) Patent No.: US 7,111,642 B2
(45) Date of Patent: Sep. 26, 2006

(54) VALVE HAVING FAST AND SLOW ACTING CLOSURE ELEMENTS

(75) Inventor: Tomohisa Takeda, Matsuyama (JP)

(73) Assignee: Miura Co., Ltd, Matsuyama (JP)

( * ) Notice: Subject to any disclaimer, the term of this patent is extended or adjusted under 35 U.S.C. 154(b) by 0 days.

(21) Appl. No.: 10/898,350

(22) Filed: Jul. 26, 2004

(65) Prior Publication Data
US 2005/0022884 A1 Feb. 3, 2005

(30) Foreign Application Priority Data
Jul. 31, 2003 (JP) .............................. 2003-283779

(51) Int. Cl.
*F16K 1/54* (2006.01)
(52) U.S. Cl. .............................. 137/614.21; 137/614.19
(58) Field of Classification Search ........... 137/614.21, 137/613, 614.19, 614.2
See application file for complete search history.

(56) References Cited

U.S. PATENT DOCUMENTS

| | | | | |
|---|---|---|---|---|
| 1,587,969 A | * | 6/1926 | Ludeman | 137/614.21 |
| 3,538,951 A | * | 11/1970 | Bownass | 137/614.21 |
| 4,601,310 A | * | 7/1986 | Phillips | 137/556 |
| 5,156,188 A | * | 10/1992 | Wakita et al. | 137/625.3 |
| 6,234,189 B1 | * | 5/2001 | Koch | 137/66 |
| 6,848,474 B1 | * | 2/2005 | Sollier | 137/613 |
| 2005/0005965 A1 | * | 1/2005 | Amazorrain | 137/65 |

FOREIGN PATENT DOCUMENTS

| | | |
|---|---|---|
| JP | 2608579 B2 | 2/1997 |
| JP | 2001-349454 A | 12/2001 |

* cited by examiner

*Primary Examiner*—Kevin Lee
(74) *Attorney, Agent, or Firm*—Birch, Stewart, Kolasch & Birch, LLP

(57) ABSTRACT

A first valve portion and a second valve portion are arranged in series in a flow passage within a valve casing to open and close the flow passage. The first valve portion includes a first valve seat, a first valve element supported to a first valve shaft and adapted to make an axial reciprocating movement into contact with or away from the first valve seat, and an opening and closing drive unit composed of a motor and a motion converting mechanism that converts a rotary motion into a linear motion, the opening and closing drive unit causing the first valve shaft to make a reciprocating movement and capable of effecting a flow rate control and slow valve-opening for the flow passage. The second valve portion includes a second valve seat, a second valve element adapted to move into contact with or away from the second valve seat, a compression spring that urges the second valve element into contact with the second valve seat, and an electromagnetic valve-opening unit for moving the second valve element away from the second valve seat by an electromagnetic force and capable of effecting quick valve-closure for the flow passage.

10 Claims, 4 Drawing Sheets

VALVE HAVING FAST AND SLOW ACTING CLOSURE ELEMENTS

This Non-provisional application claims priority under 35 U.S.C. § 119(a) on Patent Application No(s). 2003-283779 filed in Japan on Jul. 31, 2003, the entire contents of which are hereby incorporated by reference.

BACKGROUND OF THE INVENTION

1. Field of the Invention

The present invention relates to a valve for opening and closing a flow passage of a fluid.

2. Description of the Related Art

The following valve is employed as a valve for controlling a flow rate of a fluid.

The valve concerned is constructed such that a flow passage defined within a valve casing having fluid inlet and outlet portions is partitioned by a valve seat, with a valve hole of the valve seat being opened and closed by a valve element supported to a valve shaft. The valve shaft is driven back and forth in its axial direction by opening and closing drive means, closing the valve hole with the valve element supported thereto as it moves forward and opening the valve hole as it moves backward.

Conventionally, as a valve of this type, there is known one which uses a pulse motor as the above-mentioned drive means and in which the rotary force of the pulse motor is converted into linear motion to move the valve shaft forward and backward, thus opening and closing the valve hole (see, for example, JP 2608579).

With the valve described above, however, both the opening and closing of the valve element must be effected by driving the pulse motor. Therefore, when, for instance, a need arises to effect emergency valve closure, it is difficult to close the valve instantaneously. Further, when power outage occurs while the valve is open, the valve cannot be closed, which may cause a defect in equipment using a fluid.

SUMMARY OF THE INVENTION

An object of the present invention is to provide a valve that can be closed instantaneously when a need arises to effect emergency valve closure or upon occurrence of power outage.

To attain the above object, according to a first aspect of the present invention, there is provided a valve characterized by including: a valve casing having a flow passage defined therein and having a fluid inlet portion and a fluid outlet portion; and a valve portion arranged in the flow passage and adapted to open and close the flow passage, the valve portion including: flow rate controlling means for controlling a flow rate of a fluid flowing in the flow passage; slow valve-opening means for effecting slow opening of the flow passage; and quick valve-closure means for effecting quick closure of the flow passage.

The above construction allows a fluid to flow at a desired flow rate due to the flow rate controlling means, which is provided in the valve portion and used to control the flow rate of a fluid flowing in the flow passage. Further, the flow passage can be opened at a slow speed due to the slow valve-opening means for effecting slow opening of the flow passage. Further, when a need arises to effect emergency valve closure, the flow passage can be closed instantaneously by the quick valve-closing means for effecting quick closure of the flow passage.

According to a second aspect of the present invention, there is provided a valve characterized by including: a valve casing having a flow passage defined therein and having a fluid inlet portion and a fluid outlet portion; and a first valve portion and a second valve portion which are arranged in series in the flow passage and adapted to open and close the flow passage, the first valve portion including: a first valve seat having a first valve hole and partitioning the flow passage; a first valve element supported to a first valve shaft and being adapted to open and close the first valve hole while making an axial reciprocating movement into contact with and away from the first valve seat; and opening and closing drive means for causing the first valve shaft to make a reciprocating movement and capable of effecting a flow rate control and slow valve-opening for the flow passage, the opening and closing drive means being composed of a motor and a motion converting mechanism that converts a rotary motion into a linear motion, the second valve portion including: a second valve seat having a second valve hole and partitioning the flow passage; a second valve element adapted to open and close the second valve hole while moving into contact with and away from the second valve seat; a compression spring that urges the second valve element into contact with the second valve seat; and electromagnetic valve-opening means for moving the second valve element away from the second valve seat by an electromagnetic force and capable of effecting quick valve-closure for the flow passage.

With the above construction, by controlling the direction, speed, and amount of the motor rotation, the first valve element can be brought into contact with the first valve seat or moved away from the first valve seat; in the latter case, it is also possible to control at what speed and by how much distance (flow rate) the first valve seat moves away from the first valve seat (hereinafter these are referred to as the "separation speed" and "separation amount", respectively). Further, by energizing the electromagnetic valve-opening means, the second valve element can be moved away from the second valve seat against the elastic force of the compression spring, and by deenergizing the electromagnetic valve-opening means, the second valve element can be brought into contact with the second valve seat by the elastic force of the compression spring.

To elaborate, first, the first valve element of the first valve portion and the second valve element of the second valve portion are brought into contact with the first valve seat and the second valve seat to close the first valve hole and the second valve hole, respectively, and this state is taken as the original position. Then, upon valve opening, the electromagnetic valve-opening means is energized to move the second valve element away from the second valve seat; at the same time, the motor is driven to move the first valve element away from the first valve seat by a set separation amount (set flow rate).

The electromagnetic force produced by energizing the electromagnetic valve-opening means causes the second valve element to instantaneously move away from the second valve seat to open the second valve hole. Further, as the motor rotates, the first valve element moves away from the first valve seat in the valve-opening direction and at a set separation speed to thereby open the first valve hole. The first valve element then stops upon moving by the set separation amount (set flow rate). Thus, the first valve portion and the second valve portion are opened, permitting flow of a fluid at the set flow rate.

When, in this state, a need arises to effect emergency valve closure, as the electromagnetic valve-opening means is deenergized, the second valve element is brought into contact with the second valve seat by the elastic force of the compression spring, thus instantaneously closing the second valve element. Thereafter, the motor is driven to close the first valve hole by bringing the first valve element into contact with the first valve seat, thereby effecting a return to the original position.

Further, upon power outage, the electromagnetic valve-opening means is deenergized whereby the second valve element is brought into contact with the second valve seat by the elastic force of the compression spring, thus instantaneously closing the second valve hole. Then, after the power outage is cancelled, the motor is driven to bring the first valve element into contact with the first valve seat to close the first valve hole, thereby effecting a return to the original position. The above-described operations can be automatically controlled by control means.

Furthermore, the first valve portion and the second valve portion are arranged in series in the flow passage within the valve casing, and closing of the flow passage is effected by the first valve portion and the second valve portion, thus ensuring excellent leak-tight seal upon valve closure.

According to a third aspect of the present invention, in the second aspect of the invention, the valve further includes a partition wall which partitions the flow passage and in which the first valve seat of the first valve portion and the second valve seat of the second valve portion are provided, the partition wall including an opening portion serving as the first valve hole and the second valve hole, the valve being characterized in that the first valve seat is formed on one side surface of the partition wall and the second valve seat is formed on the other side surface of the partition wall.

With the above construction, although the valve employs a structure in which the first valve portion and the second valve portion are arranged in the flow passage, the opening portion formed in the partition wall serves as the first valve hole and the second valve hole, with the first valve seat being formed on one side surface of the partition wall and the second valve seat being formed on the other side surface of the partition wall, whereby it is possible to achieve compactness of the overall construction.

According to a fourth aspect of the present invention, in the second or third aspect of the invention, the valve is characterized in that the motor constituting the opening and closing drive means is constituted by a canned motor equipped with a barrier wall that provides a seal between an output shaft of the canned motor and a portion of the canned motor which imparts a rotary force to the output shaft.

With the above construction, the motor is constituted by the canned motor equipped with the barrier wall that provides a seal between an output shaft of the motor and a portion of the motor which imparts a rotary force to the output shaft, thereby reliably preventing situations where, for example, a fluid leaks through the portion of the motor which imparts a rotary force to the output shaft.

With the valve of the present invention constructed as described above, upon valve opening, the valve portion can be opened gradually to a set flow rate, and when a need arises to effect emergency valve closure or upon power outage, the valve portion can be closed instantaneously, whereby it is possible to prevent occurrence of a defect or the like in equipment using a fluid and ensure safety.

DESCRIPTION OF THE PREFERRED EMBODIMENTS

Figure 1:
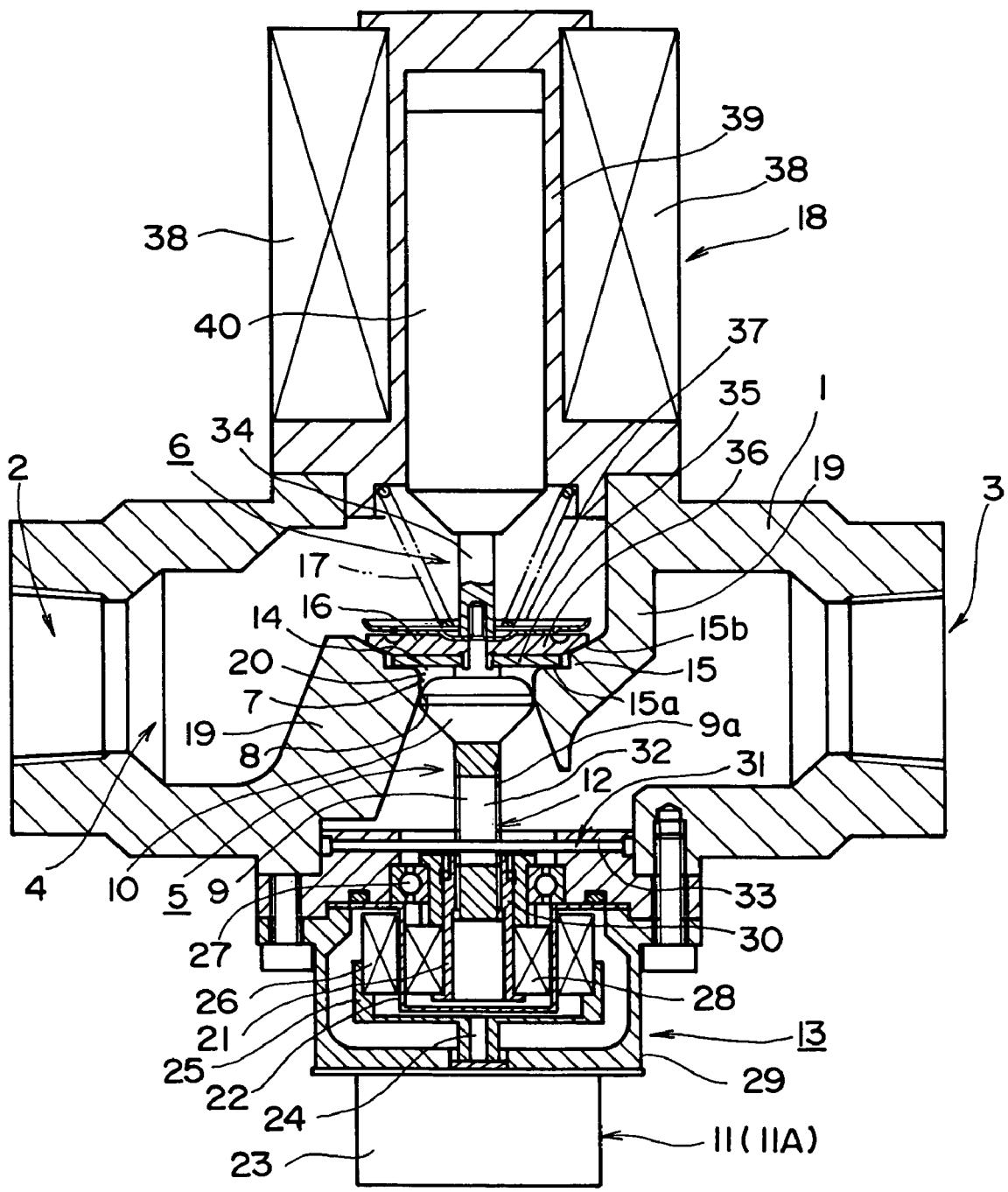
FIG. 1 is a longitudinal sectional view showing a valve according to an embodiment of the present invention, with its first valve portion and second valve portion closed.

FIGS. 1 to 4 shows a valve according to an embodiment of the present invention.

In the valve of this embodiment, a fluid inlet portion 2 connected to supply-side piping and a fluid outlet portion 3 connected to discharge-side piping are provided in a valve casing 1, and a flow passage 4 connecting the fluid inlet portion 2 and the fluid outlet portion 3 to each other is defined inside the valve casing 1.

In the flow passage 4, a first valve portion 5 and a second valve portion 6 are arranged in series for opening and closing the flow passage 4. The first valve portion 5 includes a first valve seat 8 equipped with a first valve hole 7 and partitioning the flow passage 4, a first valve element 10 supported to a first valve shaft 9 and adapted to move back and forth in the axial direction into contact with or away from the first valve seat 8, thereby opening and closing the first valve hole 7, and opening and closing drive means 13 for causing the first valve shaft 9 to make a reciprocating movement (vertical movement as seen in the drawing in this embodiment) and capable of effecting flow rate control and slow valve-opening for the flow passage. The opening and closing drive means 13 is composed of a motor 11 and a motion converting mechanism 12 that converts a rotary motion into a linear motion. A pulse motor, which provides easy control of the direction, speed, and amount of rotation, is used as the motor 11.

Further, the second valve portion 6 includes a second valve seat 15 equipped with a second valve hole 14 and partitioning the flow passage 4, a second valve element 16 adapted to move into contact with or away from the second valve seat 15 to thereby open and close the second valve hole 14, a compression spring 17 that urges the second valve element 16 into contact with the second valve seat 15, and electromagnetic valve-opening means 18 for moving the second valve element 16 away from the second valve seat 15 by an electromagnetic force and capable of effecting quick valve closure for the flow passage.

In this embodiment, the first valve seat 8 of the first valve portion 5 and the second valve seat 15 of the second valve portion 6 are provided in a partition wall 19 partitioning the flow passage 4. In more detail, the partition wall 19 that partitions the flow passage 4 is provided in the flow passage 4. The partition wall 19 includes an opening portion 20, which extends in the direction perpendicular to the straight line connecting between the fluid inlet portion 2 side and the fluid outlet portion 3 side and provides communication between the fluid inlet portion 2 side and the fluid outlet portion 3 side. The opening portion 20 constitutes the first valve hole 7 and the second valve hole 14, with the fluid outlet portion 3 side thereof being the first valve hole 7 and the fluid inlet 2 side thereof being the second valve hole 14. The first valve seat 8 is formed in the fluid outlet portion 3 side surface of the partition wall 19, and the second valve seat 15 is formed in the fluid inlet 2 side surface thereof.

In the first valve portion 5, the first valve shaft 9 supporting the first valve element 10 is arranged on the fluid outlet portion 3 side of the partition wall 19 such that the axial center of the first valve shaft 9 coincides with the center of the opening portion 20 constituting the first valve hole 7 and that the axial direction of the first valve shaft 9 is perpendicular to the flow passage 4 extending in a straight line connecting between the fluid inlet portion 2 side and the fluid outlet portion 3 side. Reciprocating movement of the first valve shaft 9 in the axial direction causes the first valve element 10 to move into contact with or away from the first valve seat 8, thus opening and closing the first valve hole 7.

The motor 11, which constitutes the opening and closing drive means 13 for moving the first valve shaft 9, is arranged such that the axis of its output shaft 21 coincides with the axis of the first valve shaft 9, with a barrier wall 22 formed of a non-magnetic material providing a seal between the output shaft 21 and a portion of the motor 11 which imparts a rotary force to the output shaft 21. The motor 11 thus constitutes a canned motor 11A. The barrier wall 22 is integrated with the valve casing 1.

In this embodiment, the canned motor 11A is composed of a pulse motor portion 23, and drive magnets 26 attached to a rotation shaft 24 of a rotor of the pulse motor 23 through the intermediation of a holder 25 to be rotationally driven. The canned motor 11A is mounted onto the valve casing 1.

The barrier wall 22 is formed in the shape of a closed-end tube. The drive magnets 26 of the canned motor 11A mounted onto the valve casing 1 are arranged on the closed-end tubular barrier wall 22. As the pulse motor portion 23 is driven, the drive magnets 26 rotate around the outer periphery of the closed-end tubular barrier wall 22.

Within the closed-end tubular barrier wall 22, the output shaft 21 is rotatably fitted with the rotation shaft 24 of the above-mentioned rotor through bearings 27 so as to be concentric with the rotation shaft 24. Provided to the output shaft 21 are follower magnets 28 arranged so as to oppose the drive magnets 26 with the barrier wall 22 therebetween. Due to the attraction of the electromagnetic force exerted by the drive magnets 26, the follower magnets 28 rotate following rotation of the drive magnets 26, thereby rotating the output shaft 21. The canned motor 11A is mounted onto the valve casing 1 by means of a tubular mounting member 29 that accommodates the drive magnets 26 therein.

Further, the motion converting mechanism 12, which constitutes the opening and closing drive means 13 together with the motor 11, is composed of a nut member 30 that rotates integrally with the rotation of the output shaft 21, a threaded portion 9a formed in the first valve shaft 9 and brought into threaded engagement with the nut member 30, and a detent means 31 for exerting detent action on the first valve shaft 9 and realizing linear motion of the first valve shaft 9 through rotation of the nut member 30. The nut member 30 is formed by shaping the output shaft 21 into a tube and forming threads in the thus shaped output shaft 21.

Further, the detent means 31 includes an elongate hole 32 formed in the axial direction of the first valve shaft 9, and a detent pin 33 provided to the valve casing 1 and slidably inserted into the elongate hole 32.

On the other hand, in the second valve portion 6, a second valve shaft 34 having the second valve element 16 supported to the forward end portion thereof is arranged on the fluid inlet portion 2 side of the partition wall 19 such that the axial center of the second valve shaft 34 coincides with the center of the opening portion 20 constituting the second valve hole 14 and that the axial direction of the second valve shaft 34 is perpendicular to the flow passage 4 extending in a straight line connecting between the fluid inlet portion 2 side and the fluid outlet portion 3 side. Reciprocating movement of the second valve shaft 34 in the axial direction causes the second valve element 16 to move into contact with or away from the second valve seat 15, thus opening and closing the second valve hole 14.

The second valve element 16 is composed of a disc-like rigid valve element portion 35 formed of metal or the like, a disc-like elastic valve element portion 36 overlapped on the rigid valve element portion 35 and formed of rubber or the like, and a disc-like valve retainer portion 37 overlapped on the elastic valve element portion 36 and formed of a metal plate or the like for preventing deformation of the elastic valve element portion 36. The elastic valve element portion 36 is formed so as to have a larger outer diameter than the rigid valve element portion 35, and the portion of the bottom surface of the elastic valve element portion 36 extending beyond the outer diameter of the rigid valve element portion 35 forms a tapered surface.

Further, the second valve seat 15, with which the second valve element 16 constructed as described above comes into contact, includes a small-diameter valve seat surface 15a with which the rigid valve element portion 35 comes into contact, and a large-diameter surface 15b with which the tapered surface of the elastic valve element portion 36 comes into contact. As the second valve element 16 comes into contact with the second valve seat 15, the tapered surface of the elastic valve element portion 36 first comes into contact with the large-diameter valve seat surface 15b, and then, after the tapered surface of the elastic valve element portion 36 undergoes deformation, the rigid valve element portion 35 comes into contact with the small-diameter valve seat surface 15a.

The second valve element 16 constructed as described above is urged into contact with second valve seat 15 by the elastic force of the compression spring 17 interposed between the valve retainer portion 37 of the second valve element 16 and the valve casing 1. Further, the other end portion of the second valve shaft 34 is coupled to the electromagnetic valve-opening means 18 for moving the second valve element 16 away from the second valve seat 15 by an electromagnetic force. The electromagnetic valve-opening means 18 includes a solenoid 39 that energizes electromagnetic coils 38, and an iron core 40 arranged on the same straight line as the second valve shaft 34 and adapted to move along the straight line as it is attracted by the electromagnetic action triggered by passage of electric current through the electromagnetic coils 38, with the iron core 40 and the second valve shaft 34 being coupled to each other. The solenoid 39 is provided outside the valve casing 1, and a cover (not shown) is provided over the solenoid 39.

Figure 2:
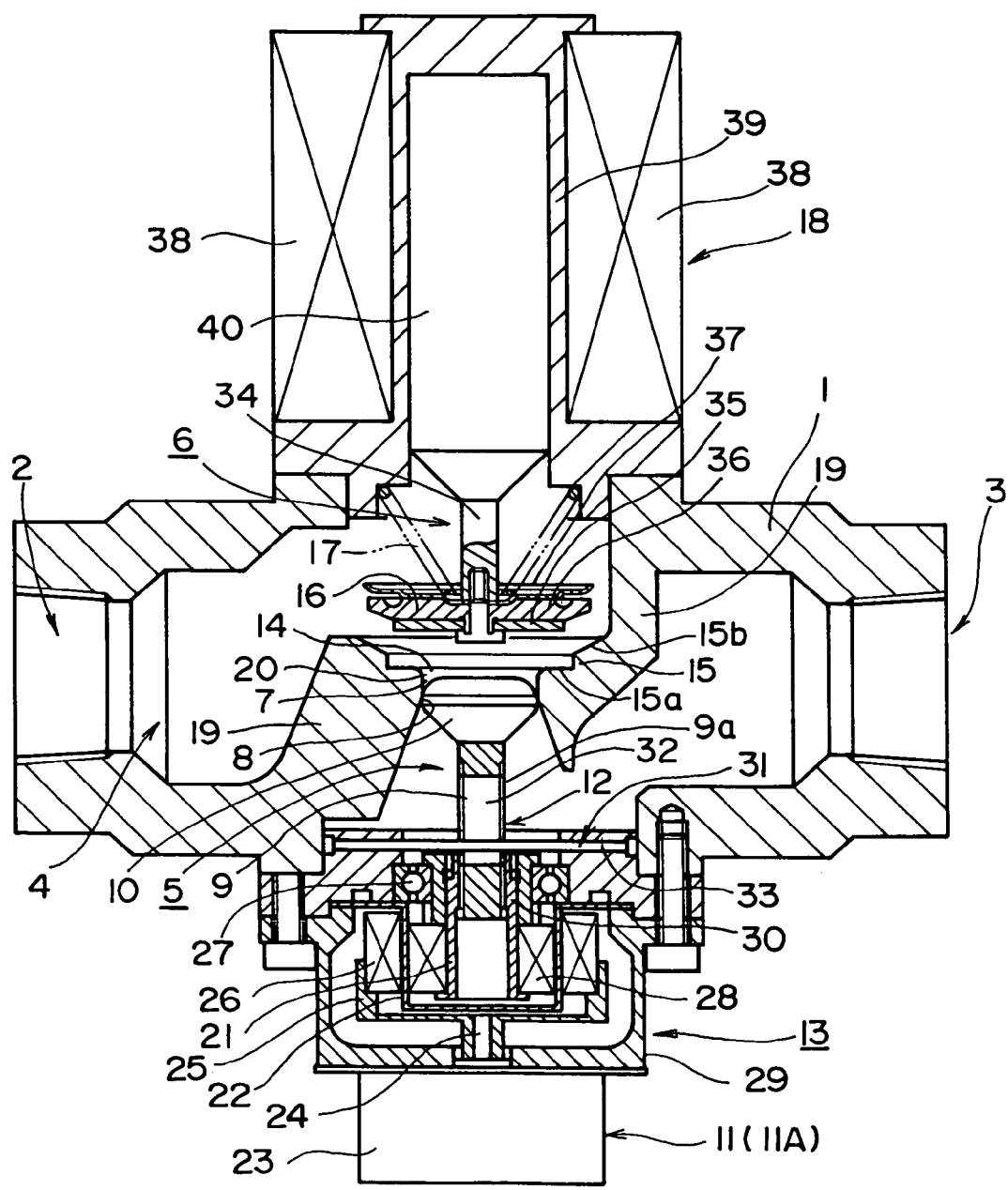
FIG. 2 is a longitudinal sectional view showing the valve according to the embodiment, with its second valve portion opened.

In the valve constructed as described above, a valve closure state, which herein refers to a state in which the first valve hole 7 and the second valve hole 14 are closed by bringing the first valve element 10 of the first valve portion 5 and the second valve element 16 of the second valve portion 6 into contact with the first valve seat 8 and the second valve seat 15, respectively, is taken as the original position (FIG. 1). In the above valve closure state, when the valve is to be opened, first, the electromagnetic coils 38 constituting the electromagnetic valve-opening means 18 are energized by passing electric current therethrough, and as the electromagnetic force thus generated attracts the iron core 40, the second valve shaft 34 moves away from the second valve seat 15 against the elastic force of the compression spring 17. As a result, the second valve element 16 moves away from the second valve seat 15, thus instantaneously opening the second valve hole 14 (FIG. 2).

Figure 3:
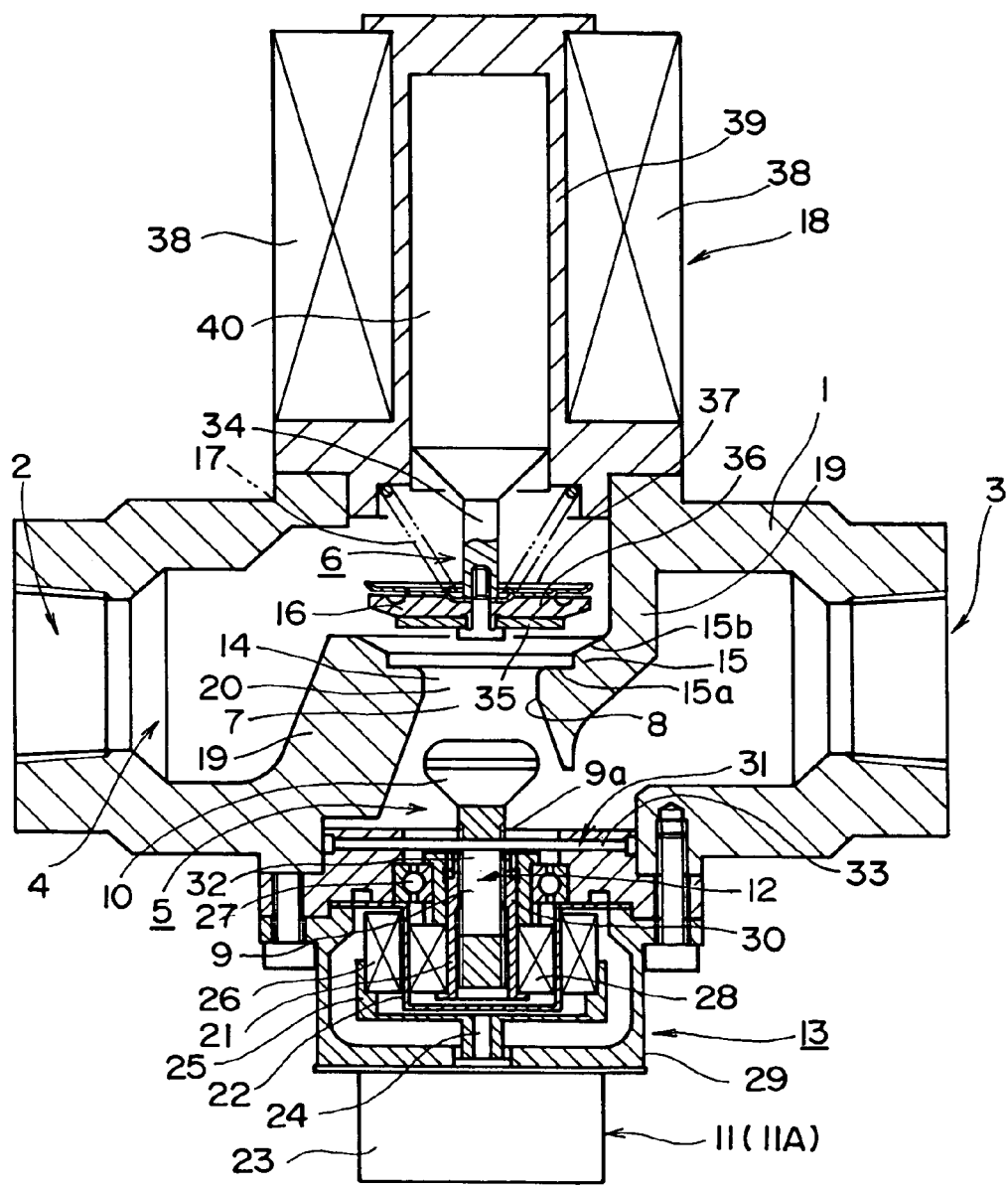
FIG. 3 is a longitudinal sectional view showing the valve according to the embodiment, with its first valve portion and second valve portion opened.

When, at the same time, the pulse motor portion 23 is driven, the drive magnets 26 rotate as the rotation shaft 24 of the rotor of the pulse motor 23 rotates. This causes the follower magnets 28, which are opposed to the drive magnets 26 with the barrier wall 22 therebetween, to rotate following the rotation of the drive magnets 26 due to the attraction exerted by the electromagnetic force of the drive magnets 26, thus causing the output shaft 21 to rotate. The output shaft 21 also serves as the nut member 30 of the motion converting mechanism 12. Since the threaded portion 9a of the first valve shaft 9 on which detent action is effected by the detent pin 33 is in threaded engagement with the output shaft 21, that is, the nut member 30, the rotation of the output shaft 21, that is, the rotation of the nut member 30, causes the first valve shaft 9 to move away from the first valve seat 8. As a result, the first valve element 10 moves away from the first valve seat 8 at a set separation speed to open the valve hole 7 before stopping upon moving by a set movement amount (FIG. 3). The set movement amount of the first valve element 10 at this time, that is, the valve opening, can be freely set by adjusting the rotation amount (rotation angle) of the pulse motor portion 23. Likewise, the separation speed of the first valve element 10, that is, the valve opening speed, can be freely set by adjusting the number of revolution of the pulse motor portion 23. The first valve portion 5 and the second valve portion 6 are thus opened, permitting flow of a fluid at a set flow rate.

Figure 4:
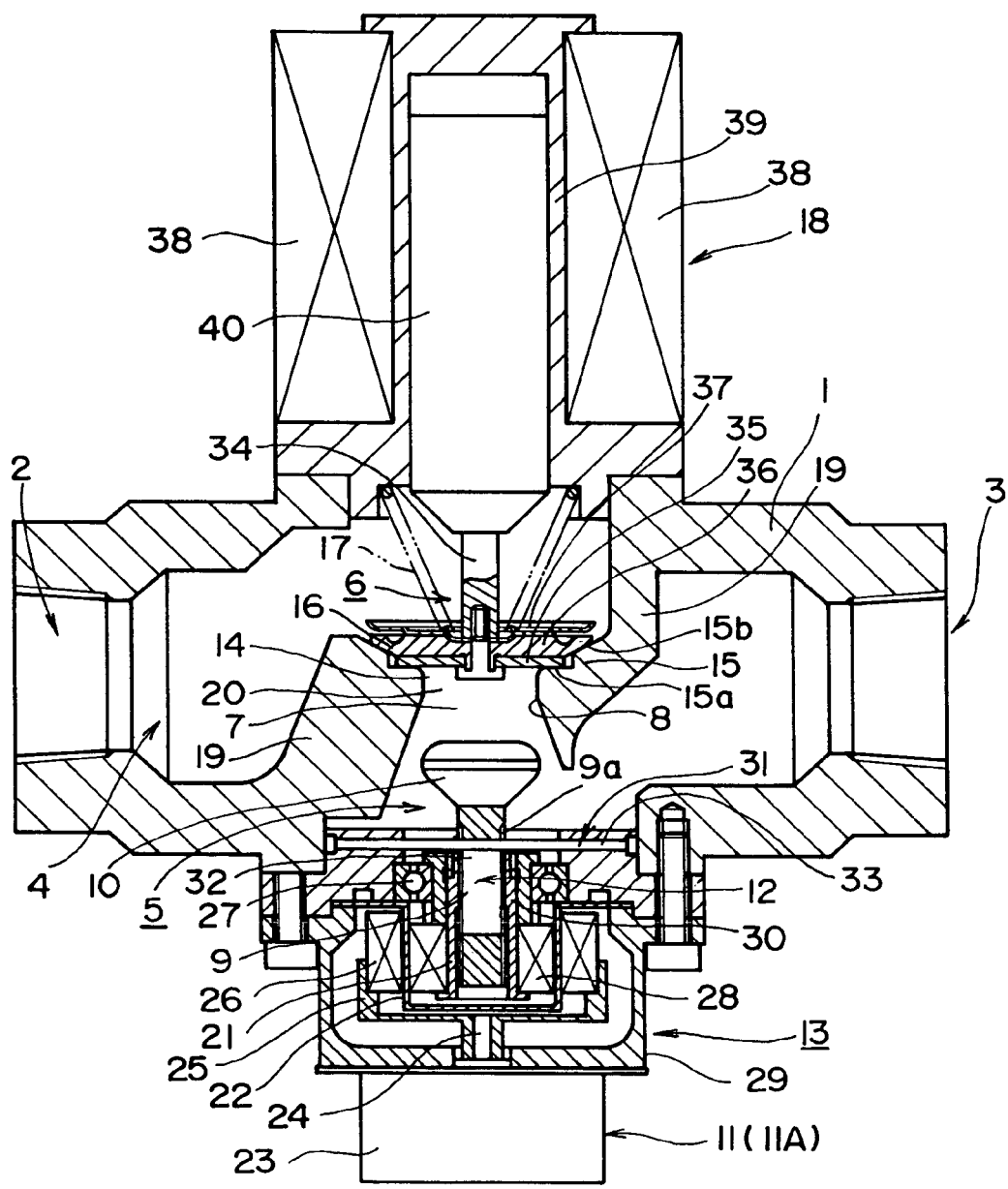
FIG. 4 is a longitudinal sectional view showing the valve according to the embodiment, with its second valve portion closed.

When, in this state, a need arises to effect emergency valve closure, as the electromagnetic coils 38 constituting the electromagnetic valve-opening means 18 are deenergized by stopping passage of electric current therethrough, the iron core 40, the second valve shaft 34, and the second valve element 16 are urged toward the second valve seat 15 by the elastic force of the compression spring 17, whereby the second valve element 16 comes into contact with the second valve seat 15, closing the second valve hole 14 instantaneously (FIG. 4). Thereafter, the pulse motor portion 23 is driven so that the first valve element 10 is brought into contact with the first valve seat 8 to close the first valve hole 7, thereby effecting a return to the original position.

Upon power outage, the passage of electric current through the electromagnetic coils 38 constituting the electromagnetic valve-opening means 18 is interrupted, causing them to be deenergized. Thus, as described above, the second valve element 16 is brought into contact with the second valve seat 15 by the elastic force of the compression spring 17, thereby closing the second valve hole 14 instantaneously (FIG. 4). Then, after the power outage is cancelled, the pulse motor portion 23 is driven to bring the first valve element 10 into contact with the first valve seat 8 to close the first valve hole 7, thereby effecting a return to the original position. In effecting the emergency valve closure described above, in this embodiment, the second valve portion 6 includes the partition wall 19, which partitions the flow passage 4, arranged on the fluid inlet 2 side. Thus, in addition to the elastic force of the compression spring 17, the pressure of the fluid on the supply side also acts on the second valve element 16, whereby the second valve element 16 comes into contact with the second valve seat 15 even more instantaneously, thereby closing the second valve hole 14 with reliability.

The above-described opening and closing of the first and second valve portions 5 and 6, and emergency closure of the first and second valve portions 5 and 6, can be automatically controlled by control means. Further, in the valve of this embodiment, the first valve portion 5 and the second valve portion 6 are arranged in series in the flow passage 4 within the valve casing 1, and the flow passage 4 is closed by the first valve portion 5 and the second valve portion 6, thus ensuring excellent leak-tight seal upon valve closure.

Further, although the valve employs the structure in which the first valve portion 5 and the second valve portion 6 are arranged in the flow passage 4, the opening portion 20 formed in the partition wall 19 serves as the first valve hole 7 and the second valve hole 14, with the first valve seat 8 being formed on one side surface of the partition wall 19 and the second valve seat 15 being formed on the other side surface of the partition wall 19, whereby it is possible to achieve compactness of the overall construction.

Furthermore, the motor 11 constituting the opening and closing drive means 13 is constituted by the canned motor 11A, with the barrier wall 22 providing a seal between the output shaft 21 of the motor and a portion of the motor which imparts a rotary force to the output shaft 21, thereby reliably preventing situations where, for example, a fluid leaks through the portion of the motor 11 which imparts a rotary force to the output shaft 21 of the motor 11.

What is claimed is:

1. A valve comprising:
   a valve casing having a flow passage defined therein and having a fluid inlet portion and a fluid outlet portion; and
   a first valve portion and a second valve portion which are arranged in series in the flow passage and adapted to open and close the flow passage,
   the first valve portion comprising:
   a first valve seat having a first valve hole and partitioning the flow passage;
   a first valve element supported by a first valve shaft and adapted to open and close the first valve hole while making an axial reciprocating movement into contact with and away from the first valve seat; and
   opening and closing drive means for causing the first valve shaft to make a reciprocating movement and capable of effecting a flow rate control and slow valve-opening for the flow passage, the opening and closing drive means comprising a motor and a motion converting mechanism that converts a rotary motion into a linear motion,
   the second valve portion comprising:
   a second valve seat having a second valve hole and partitioning the flow passage;
   a second valve element opposite said first valve element adapted to open and close the second valve hole while moving into contact with and away from the second valve seat;
   a compression spring that urges the second valve element into contact with the second valve seat;
   electromagnetic valve-opening means for moving the second valve element away from the second valve seat by an electromagnetic force and capable of effecting quick valve-closure for the flow passage, and
   a partition wall which partitions the flow passage and in which the first valve seat of the first valve portion and the second valve seat of the second valve portion are provided, the partition wall comprising an opening portion serving as the first valve hole and the second valve hole, wherein the first valve seat is formed on one side surface of the partition wall and the second valve seat is formed on the other side surface of the partition wall.

2. A valve according to claim 1, wherein the motor constituting the opening and closing drive means comprises a canned motor equipped with a barrier wall that provides a seal between an output shaft of the canned motor and a portion of the canned motor which imparts a rotary force to the output shaft.

3. A valve comprising:

a valve casing having a flow passage defined therein and having a fluid inlet portion and a fluid outlet portion; and a first valve portion and a second valve portion which are arranged in series in the flow passage adjacent a partition wall, the first valve portion comprising a first valve seat on said partition wall and a first valve element and a rotary motor for shifting said first valve element between a first position engaging the first valve seat to seal the flow passage and a second position spaced from the first valve seat; and the second valve portion comprising a second valve seat on said partition wall and a second valve element resiliently biased toward said second valve seat and an electromagnetic actuator for shifting said second valve element between a first position engaging the second valve seat to seal the flow passage and a second position spaced from the second valve seat.

4. The valve of claim 3 including a motion converting mechanism for converting rotary motion of said rotary motor to linear motion.

5. The valve of claim 4 wherein said rotary motor comprises a pulse motor.

6. The valve of claim 3 wherein said electromagnetic actuator comprises a solenoid.

7. The valve of claim 3 including a spring resiliently biasing said second valve element toward said second valve seat.

8. The valve of claim 3 wherein said first valve element is coaxially aligned with said second valve element.

9. A valve comprising:

a valve casing having a flow passage defined therein and having a fluid inlet portion and a fluid outlet portion; and a first valve portion and a second valve portion which are arranged in series in the flow passage, the first valve portion comprising:

a first valve seat having a first valve hole and partitioning the flow passage;

a first valve element supported by a first valve shaft and adapted to axially reciprocate toward and away from the first valve seat and the second valve portion; and a drive for causing the first valve shaft to make a reciprocating movement and capable of effecting a flow rate control and slow valve-opening for the flow passage, the drive comprising a motor and a motion converting mechanism that converts a rotary motion into a linear motion, the second valve portion comprising:

a second valve seat having a second valve hole and partitioning the flow passage;

a second valve element adapted to open and close the second valve hole while moving into contact with and away from the second valve seat and toward and away from the first valve portion;

a compression spring that urges the second valve element into contact with the second valve seat; and an electromagnetic valve opener for moving the second valve element away from the second valve seat by an electromagnetic force and capable of effecting quick valve-closure for the flow passage.

10. The valve of claim 9 wherein said first valve element is coaxially aligned with said second valve element.

* * * * *